United States Patent
Pisetskiy

(10) Patent No.: US 12,459,673 B2
(45) Date of Patent: Nov. 4, 2025

(54) SPACE DEBRIS DECELERATION SYSTEM AND METHOD

(71) Applicant: Sergey Vladimirovich Pisetskiy, London (CA)

(72) Inventor: Sergey Vladimirovich Pisetskiy, London (CA)

(*) Notice: Subject to any disclaimer, the term of this patent is extended or adjusted under 35 U.S.C. 154(b) by 239 days.

(21) Appl. No.: 18/204,388

(22) Filed: May 31, 2023

(65) Prior Publication Data

US 2024/0400229 A1 Dec. 5, 2024

Related U.S. Application Data

(60) Provisional application No. 63/347,995, filed on Jun. 1, 2022.

(51) Int. Cl.
*B64G 1/10* (2006.01)
*B64G 1/00* (2006.01)

(52) U.S. Cl.
CPC .......... *B64G 1/1081* (2023.08); *B64G 1/005* (2013.01); *B64G 1/008* (2023.08)

(58) Field of Classification Search
CPC .............................. B64G 1/1081; B64G 1/2421
See application file for complete search history.

(56) References Cited

U.S. PATENT DOCUMENTS

| | | | |
|---|---|---|---|
| 4,936,528 A | 6/1990 | Butner et al. | |
| 5,405,108 A * | 4/1995 | Marin, Jr. | B64G 1/56 |
| | | | 102/293 |
| 6,830,222 B1 * | 12/2004 | Nock | B64G 1/2227 |
| | | | 244/110 D |
| 8,800,933 B2 * | 8/2014 | Dunn | B64G 1/56 |
| | | | 244/158.6 |
| 8,919,702 B2 | 12/2014 | Gregory et al. | |
| 9,187,191 B1 * | 11/2015 | Jensen | B64G 1/242 |
| 9,302,789 B2 | 4/2016 | Hanada et al. | |
| 9,434,485 B1 | 9/2016 | Lehocki | |
| 9,714,101 B1 * | 7/2017 | Kaplan | B64G 1/26 |
| 2011/0210208 A1 * | 9/2011 | Ganguli | B64G 1/66 |
| | | | 244/113 |

(Continued)

FOREIGN PATENT DOCUMENTS

| | | | | |
|---|---|---|---|---|
| WO | WO 2023/137082 A1 | | 7/2023 | |
| WO | WO-2024023971 A1 * | | 2/2024 | B64G 1/1081 |

OTHER PUBLICATIONS https://fas.org/publication/how-do-you-clean-up-170-million-pieces-of-space-junk/ by Vijay Iyer, May 24, 2023.*

(Continued)

*Primary Examiner* — Christopher P Ellis
(74) *Attorney, Agent, or Firm* — Santosh K. Chari; CPST Intellectual Property Inc.

(57) ABSTRACT

The system and method for decelerating space objects moving at high velocities are provided. The system comprises at least one closed volume containing a combination of gas, liquid, solid particles, or a mixture thereof. The volume can be transported to the targeted location using a range of means, including a chemical gun, light gas gun, electromagnetic coil gun, superconducting quench gun, a rocket, or a combination thereof. The volume is strategically positioned on the trajectory of the moving object. Upon penetrating the walls of the volume, the object passes through it, experiencing deceleration.

25 Claims, 4 Drawing Sheets

(56) References Cited

U.S. PATENT DOCUMENTS

| | | | |
|---|---|---|---|
| 2012/0068018 A1 | 3/2012 | Wright | |
| 2012/0241562 A1* | 9/2012 | Dunn | B64G 1/56 |
| | | | 102/530 |
| 2013/0001365 A1* | 1/2013 | Kang | B64G 1/2427 |
| | | | 244/158.6 |
| 2013/0082146 A1* | 4/2013 | Kofford | B64G 1/1081 |
| | | | 244/158.7 |
| 2017/0313447 A1* | 11/2017 | Reed | B64G 1/623 |
| 2018/0029728 A1* | 2/2018 | Rasse | B64G 1/623 |
| 2022/0204187 A1* | 6/2022 | Richard-Noca | B64G 1/2229 |
| 2024/0101280 A1* | 3/2024 | Lindsay | B64G 1/2224 |

OTHER PUBLICATIONS

International Search Report and Written Opinion issued in PCT/CA2024/051221, dated Jan. 24, 2025.

* cited by examiner

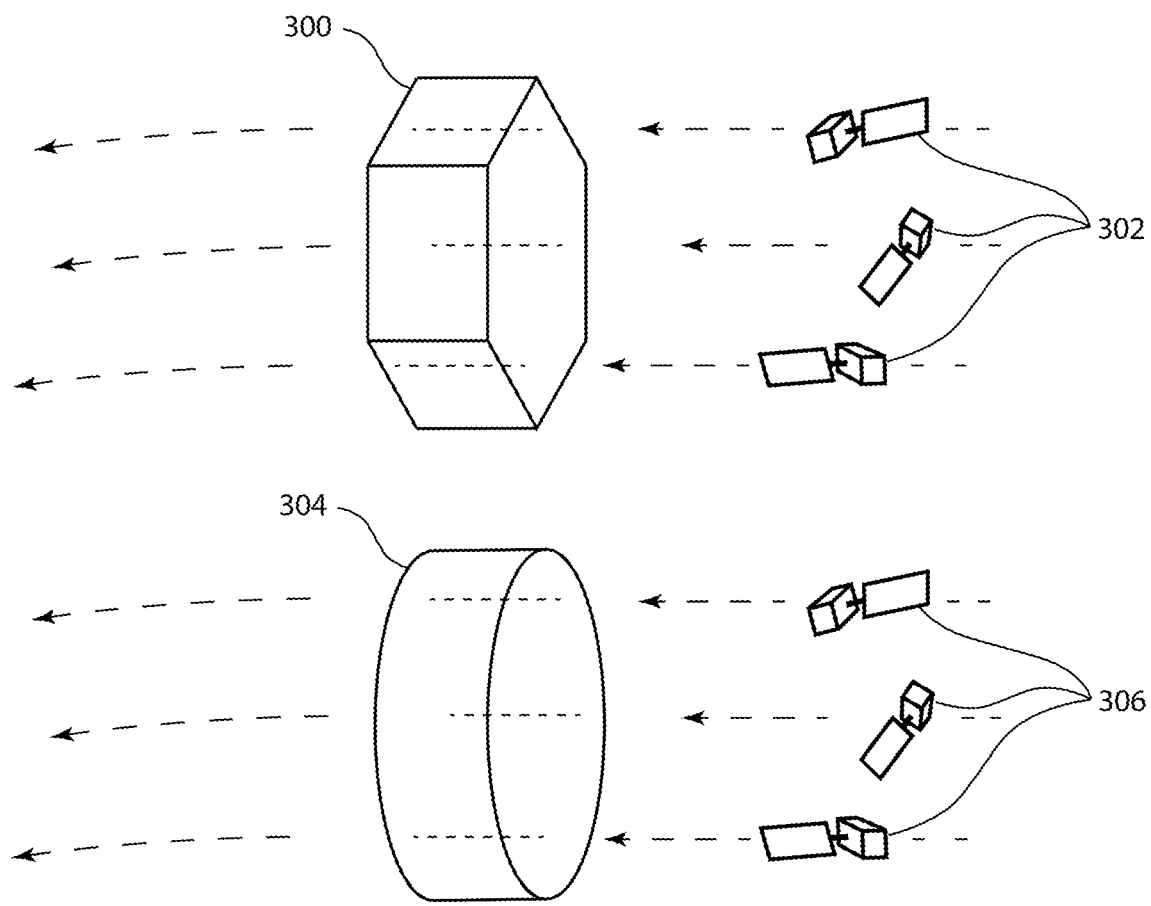
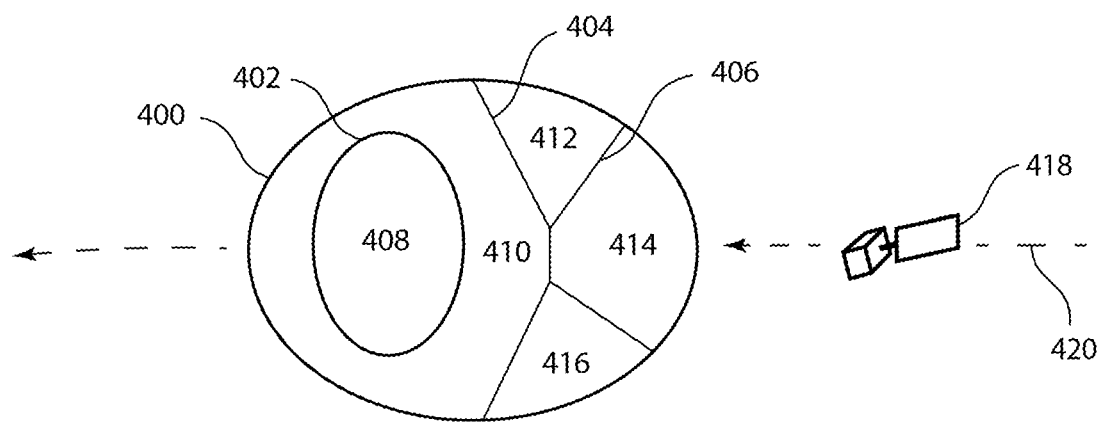
FIG. 4

SPACE DEBRIS DECELERATION SYSTEM AND METHOD

CROSS REFERENCE TO PRIOR APPLICATIONS

The present application claims priority under 35 USC § 119(e) to U.S. Provisional Application No. 63/347,995, filed May 31, 2023, the contents of which are incorporated herein by reference as if set forth in its entirety.

BACKGROUND

The presence of space debris in the Earth's and other celestial bodies' orbits poses a significant danger to both manned spacecraft and unmanned satellites. Collisions with these objects, given their high relative velocities, can release an immense amount of kinetic energy, potentially causing severe damage to the vehicle's structure and endangering the lives of crew members.

The sources of space debris include discarded boosters and their components, defunct satellites, lost instruments and parts, as well as fine particles like dust, solid rocket motor slug, and paint flakes. Additionally, numerous pieces of satellites intentionally destroyed during military exercises significantly contribute to the growing debris problem.

As the quantity of space debris continues to escalate, the likelihood of collisions among them increases, potentially triggering the phenomenon called Kessler Syndrome. This phenomenon entails a self-sustaining chain reaction where debris collisions generate more debris, leading to an exponential growth in their numbers.

To address these challenges and ensure the safety of future space flights, it is crucial to develop a low-cost and effective system capable of removing orbital debris and preventing the onset of Kessler Syndrome. This system would require a cost-effective transportation method to deliver the necessary equipment to high altitudes where the space debris can be intercepted and removed.

SUMMARY

To address the need of altering the trajectory of space debris or unwanted high-velocity objects at various altitudes above Earth's and other celestial bodies' surfaces, a system and method for deceleration have been invented. This approach aims to reduce the velocity of the space object, enabling it to change its trajectory. As a result, the object will enter a decaying orbit and subsequently either disintegrate in the atmosphere (if present) or collide with the surface of the celestial body following a ballistic or near-ballistic trajectory. Alternatively, the decelerated object may enter a lower orbit or adopt an alternative trajectory to evade potential collisions or unwanted interactions with other space objects.

The deceleration of a high-velocity object is achieved as follows. A deceleration system, comprised of at least one closed volume containing a liquid or gaseous substance, is strategically positioned on the trajectory of the moving object. Upon penetrating the walls or membranes of the volume, the object enters the enclosed space with a liquid or gaseous substance. When moving through the substance, the object experiences dynamic forces that effectively reduce its velocity. Additionally, the object experiences heating due to the drag and compression of the liquid or gaseous substance in front of it. The heating can lead to melting, burning, and evaporation of material from the object. The mechanical stresses resulting from hydrodynamic forces can cause the disintegration of the object.

The velocity loss experienced by the object depends on both the duration and magnitude of the hydrodynamic forces it encounters. The duration of the object's movement through the liquid or gaseous substance depends on the object's speed and the distance it travels through the liquid or gaseous substance, with longer distances resulting in greater speed reductions. The magnitude of the hydrodynamic forces depends on the object's speed and the density of the substance where higher density and higher speed lead to increased decelerating forces. Therefore, the parameters of the substance, including its chemical formula, pressure, temperature, and density, together with the object's velocity, shape, mass, and path within the volume, collectively determine the overall velocity reduction. Based on these parameters and using modern knowledge in the field of hydrodynamics, thermodynamics, and chemistry, it is possible to accurately predict the magnitude of velocity loss.

During the process of deceleration, the shock waves in the substance from the moving object may disintegrate the walls or membranes in a manner resembling an explosion. However, the acquired velocity of the resulting fragments of the walls or membranes will not be sufficient to maintain an orbit, therefore, the fragments will descend to the celestial body shortly after the disintegration.

Using the invented method, the moving object can be decelerated either to a velocity below orbital speed, resulting in a subsequent deorbiting, or to a pre-determined velocity that enables a required trajectory change without immediate deorbiting. This minor adjustment may be necessary to avoid collisions with other objects in space.

To deliver the deceleration system to the required location on the trajectory of the moving space object, various launch means and methods could be used. A ground-based, a sea-based, or an airborne launch platform equipped with an accelerator, such as a chemical gun, an electromagnetic coil gun, or a superconducting quench gun can be used. These means and methods can ensure both the necessary altitude above the surface of the Earth or a celestial body and sufficient accuracy to position the system on the object's trajectory.

An alternative approach to launching the deceleration system is to use a rocket. The launch of the system on board a rocket can be carried out from the ground, from an offshore platform, a ship, a submarine, or an airborne platform, including an airplane, helicopter, airship, or balloon.

The deceleration system's launch can be performed either vertically or at an angle, ensuring that the tangential component of the system's velocity remains below the orbital speed. This launch profile effectively prevents the risk of generating additional space debris from the system's components.

Launching or deploying the deceleration system can also be done from a spacecraft. However, if the system is designed to move with an orbital velocity or higher, it should be equipped with means preventing it from becoming uncontrolled, orbital debris, or an undesirable space object. Such means may include but are not limited to collision avoidance equipment, active propulsion system, and deorbiting mechanisms.

The deceleration system can be equipped with rocket engines, gas thrusters, reaction wheels, and other passive or active means to adjust its positioning in space along the object's trajectory, control speed, and maintain proper orientation before, during, and after interaction with the moving object.

During launch and positioning or the deceleration system, a liquid or gaseous substance can be initially stored as a payload in a small package. The substance can be in a compressed, liquefied, solidified, or chemical form with one or more components capable of reacting and generating the necessary amount of substance for object deceleration.

To achieve and keep the properties of a liquid or gaseous substance as required at the time of interaction with the moving object, the volume of the substance is enclosed within at least one wall or membrane. The walls or membranes of the volume are constructed from materials of sufficient strength to contain the liquid or gaseous substance at the required conditions until the interaction with the intended object occurs. These materials allow the object to penetrate without causing object explosive disintegration or ricochet.

Initially, before and during the launch of the deceleration system, the walls or membranes of the volume can be stored in a small package. At the required time the volume can be deployed, unfolded, stretched, or expanded and filled with the liquid or gaseous substance to prepare for object deceleration.

The deployed volume of the deceleration system can have a simple spherical shape or an elongated shape such as a cylinder, blimp, or cigar, and be oriented along the path of the moving object to increase the length of the object's path through the substance. To decelerate a group of closely spaced moving objects or a cloud of space debris, the volume can be designed as a flat disk or polygonal prism of the required thickness and oriented perpendicular to the trajectory of the moving objects.

Each volume in the deceleration system can be divided by internal walls or membranes into a plurality of communicated or not communicated volumes. Additionally, each volume can contain one or a plurality of internal volumes. The internal volumes can be filled with the same or with different liquid or gaseous substances under the same or different conditions to improve the efficiency of the system.

Multiple volumes can be used, arranged sequentially along the object's trajectory and containing the same or different liquid or gaseous substances, which may be under the same or different conditions, such as pressure and temperature. Sequential positioning enables step deceleration that can enhance the overall efficiency by improving the interaction between the moving object and the substance within each volume at each step.

The volumes of the deceleration system can be arranged freely or connected to each other in various ways to form the required stable geometric configuration. The means for connecting include but are not limited to, various tethers, cables, spacers, struts, membranes, electric and magnetic fields, as well as surrounding shells and films.

As an example of the deceleration system application, the process of removing space debris from the Earth's orbit can be as follows.

The deceleration system is comprised of a folded balloon, a hydrogen peroxide tank, a gas generator with a catalyst, a control and communications system, a parachute system, and a system for attitude and position control.

The launch of the deceleration system is carried out from a sea-based launch platform, which is positioned at the required location in a lake, sea, or ocean. The system is launched as a payload aboard the first stage of a reusable commercial rocket system. The launch follows a ballistic trajectory, similar to sounding rockets, to prevent the payload from becoming space debris both in case of a successful debris interception or in case of a miss.

The first stage accelerates the payload and delivers it to the predetermined altitude. The stage then returns to the launch platform for a soft landing. The deceleration system continues to follow the ballistic trajectory and starts generating steam and oxygen by catalytically decomposing hydrogen peroxide. The generated gas inflates the balloon and deploys it as required shortly before the system reaches the apogee of the ballistic trajectory. At the apogee, when the vertical velocity is zero, the ballistic trajectory intersects the trajectory of the space debris. The onboard guidance system ensures that the balloon reaches the debris trajectory at the correct time for successful debris interception.

Upon membrane penetration, the debris moves through the gas inside the balloon at hypersonic speed, experiencing significant aerodynamic forces that slow down its flight. The object heats up, breaks apart, and partly burns. After exiting the gas balloon, the remnants of the space debris move with the velocity below orbital, therefore they enter Earth's atmosphere along a ballistic trajectory, and either completely burn up or fall in the designated area.

Penetrated by the debris, the balloon membrane ruptures due to gas shock waves, and the gas escapes into space. The deflated balloon and the rest of the deceleration system equipment continue to follow the ballistic trajectory, enter the Earth's atmosphere, and perform a soft landing using parachutes.

The invented method effectively reduces the velocity of the moving object, causing it to deorbit and descend to a designated area on Earth or on the celestial body. Alternatively, the object can be put into a lower orbit, allowing for potential subsequent deceleration steps or other manipulations. This method also offers flexibility in altering the object's trajectory to achieve various objectives that do not require deorbiting, such as altitude control and collision avoidance.

The versatility of this method enables its application to a wide range of objects, including space debris moving on different trajectories with different velocities. The trajectories encompass orbits ranging from low to high altitude and beyond. The size of the space object that can be intercepted and decelerated is determined by the capacity of the gas volume. For larger and heavier objects, multiple deceleration systems can be used by sequentially deploying them along the object's trajectory.

BRIEF DESCRIPTION OF THE DRAWINGS

FIG. 3 shows a variety of shapes for a volume with a liquid or gaseous substance used to decelerate groups of objects moving close to each other or clouds of debris;

FIG. 4 shows a volume divided by walls or membranes into a plurality of volumes containing the same or different liquid or gaseous substances;

DETAILED DESCRIPTION

To provide a proper understanding of the invention, the illustrations in the patent application are described in detail as follows.

Figure 1:
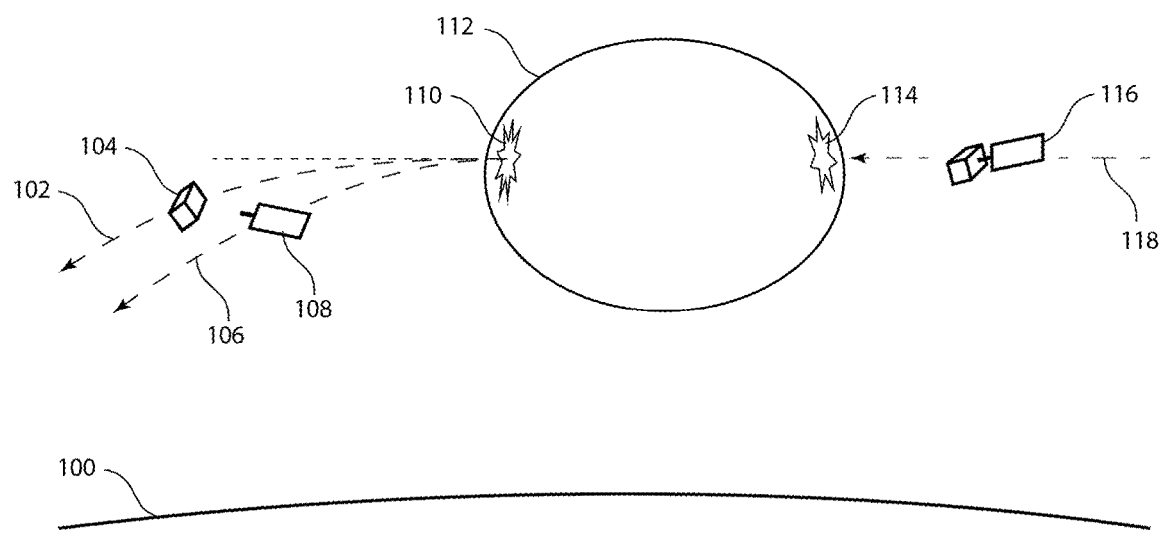
FIG. 1 shows a method of decelerating a space object moving at high velocity using a volume with a liquid or gaseous substance positioned on the trajectory of the object.

FIG. 1 shows the overall concept of the high-velocity space object deceleration method. The deceleration system is comprised of volume 112 with a liquid or gaseous substance positioned on the trajectory of space object 116 flying above surface 100 of the Earth or a celestial body. Volume 112 is strategically positioned on the trajectory of the targeted moving object 116 at the predetermined time such as the object penetrates the volume wall or membrane on one side, creating entry hole 114. As the object passes through the substance within the volume, it experiences a reduction in velocity, accompanied by processes such as melting, burning, and disintegration. Finally, the object emerges from the opposite side of the volume, creating an exit hole 110. The remaining pieces 104 and 108 of the initial object 116, having partially lost their speed, follow trajectories 102 and 106 that are different from the initial trajectory 118 due to the gravitational field of the Earth or a celestial body.

Figure 2:
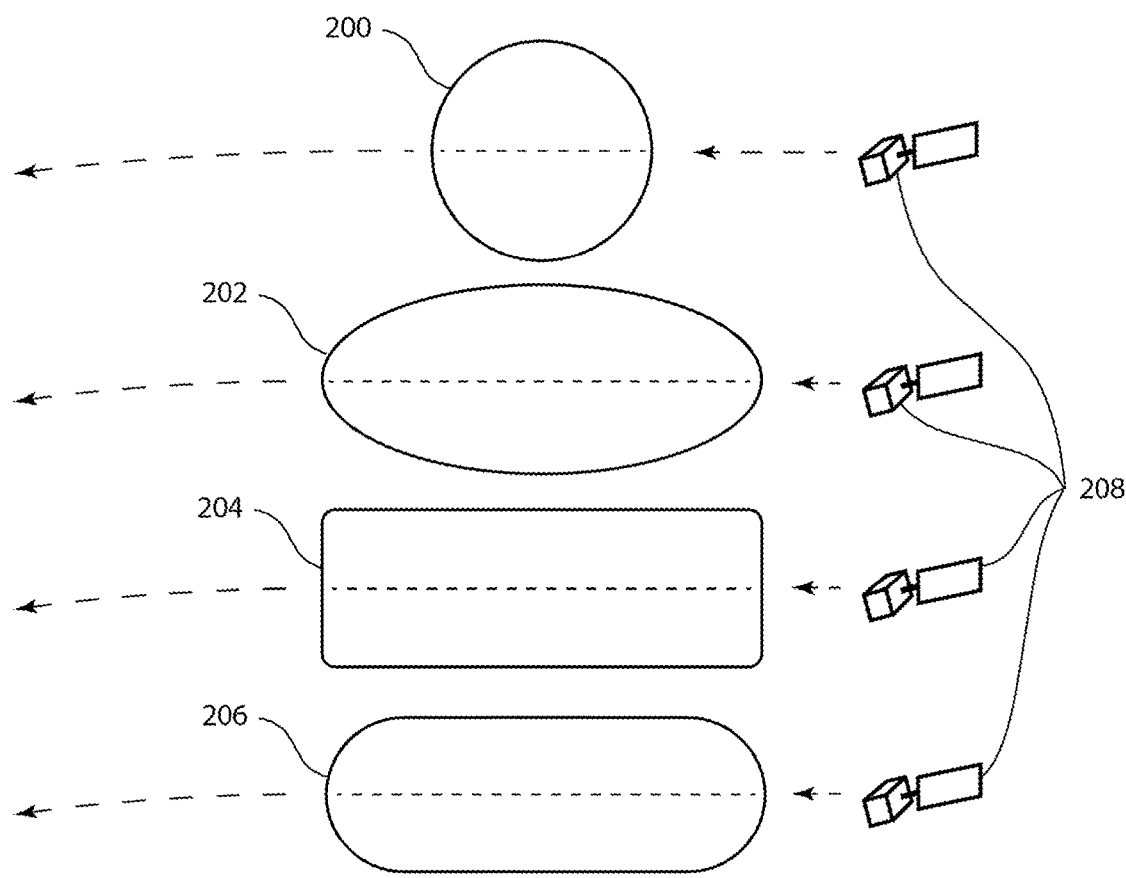
FIG. 2 shows a variety of shapes for a volume with a liquid or gaseous substance used to decelerate high-velocity space objects.

FIG. 2 shows a variety of shapes for volumes with a liquid or gaseous substance (200, 202, 204, 206) that can be used to decelerate the high-velocity space object 208. Volume 200 features a simple spherical shape. Volume 202 has an elliptical blimp-like shape, aligned along the trajectory of moving object 208. Volume 204 exhibits a cylindrical shape and is also oriented along the trajectory of moving object 208. Volume 206 has an elongated cigar-like shape and is oriented along the trajectory of moving object 208 as well. By aligning the volumes with the object's trajectory, the path through the substance is increased, resulting in enhanced velocity loss for the same amount of substance.

FIG. 3 shows a variety of shapes for volumes with a liquid or gaseous substance (300, 304) that can be used to decelerate a group of objects (302, 306) moving closely together in space. Volume 300 features a polygonal prism positioned perpendicular to the trajectory of the group of space objects 302. Volume 304 has the form of a flat cylinder or a disk and is also oriented perpendicular to the trajectory of the group of moving objects 306. The perpendicular orientation allows the deceleration of a bigger group of closely spaced objects or a larger cloud of space debris.

FIG. 4 shows volume 400 of the deceleration system which comprises internal volume 408 surrounded by membrane or wall 402. The substance contained within volume 408 can be the same or different from the substance in volume 400. Furthermore, volume 400 is divided by internal walls or membranes 404 and 406, creating multiple internal volumes 410, 412, 414, and 416. Each internal volume can be filled with the same or different liquid or gaseous substance. Consequently, as space object 418 moves along its trajectory 420, it will encounter varying deceleration and destructive forces while traversing the internal volumes of the system.

Figure 5:
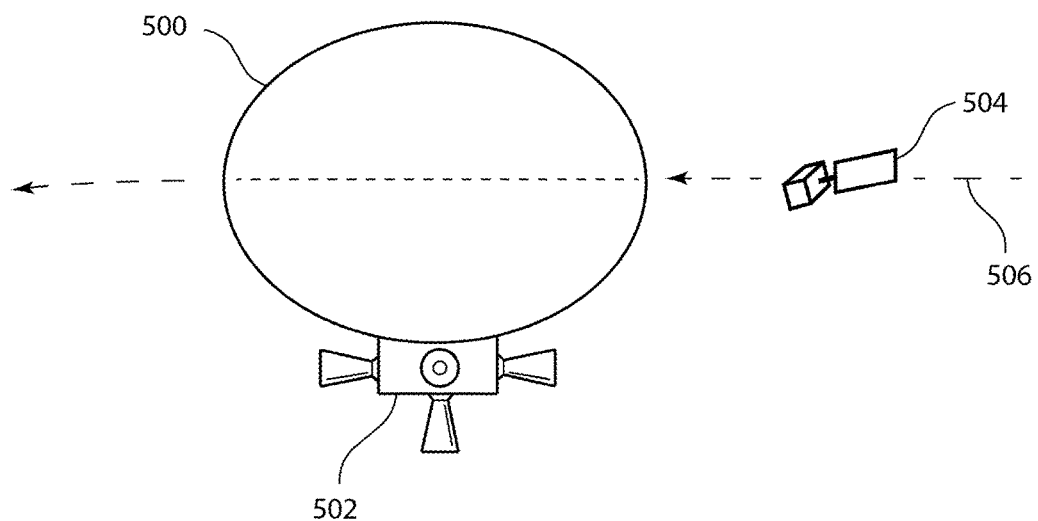
FIG. 5 shows a volume with a liquid or gaseous substance that is equipped with thrusters for position and orientation control.

FIG. 5 shows a deceleration system comprising volume 500 filled with a liquid gaseous substance. The system is equipped with apparatus 502 with thrusters to enable position and orientation control to improve the effectiveness of space object 504 interception as it moves along trajectory 506. In case of a failed object interception, the system can utilize apparatus 502 to relocate itself to the trajectory of another moving object, ensuring adaptability and continued functionality.

Figure 6:
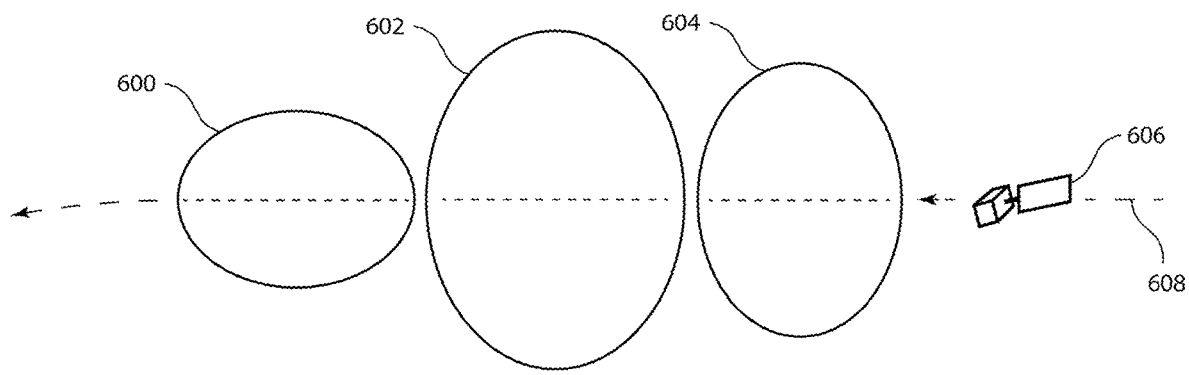
FIG. 6 shows several volumes with liquid or gaseous substances positioned sequentially on the trajectory of the moving object to perform multiple steps of deceleration of the object.

FIG. 6 shows a deceleration system comprising volumes 600, 602, and 604, arranged sequentially along trajectory 608 of space object 606. The volumes can contain the same or different liquid or gaseous substances, which may be under similar or different conditions, such as pressure and temperature. The sequential positioning of volume 600 facilitates a stepwise deceleration of object 606 as it interacts with the substance within each volume at every step.

Figure 7:
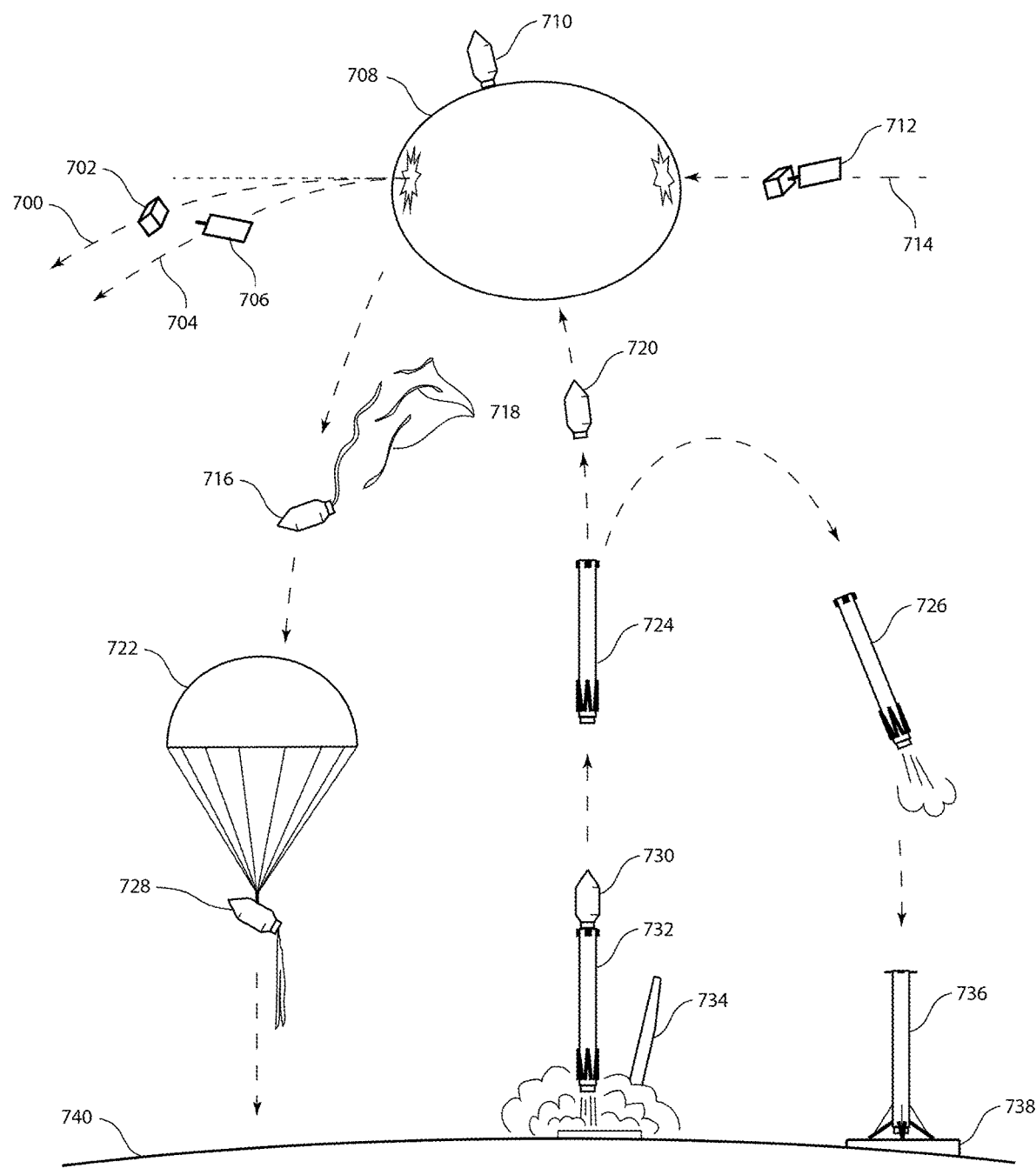
FIG. 7 shows the work sequence diagram for the orbital debris deceleration using a rocket-launched deceleration system.

FIG. 7 shows the work sequence diagram for the orbital debris deceleration using a rocket-launched deceleration system. The deceleration system 730 is launched as a payload onboard a rocket booster 732 from Earth's surface 740, utilizing a ground or sea-based launch platform 734. The rocket booster 732 can be the first stage of a reusable commercial rocket system. The launch follows a ballistic trajectory similar to sounding rockets. At a predetermined time, rocket booster 724 and the payload 720, containing the decelerating system, separate. Subsequently, rocket booster 726 initiates a boost-back burn and returns to the landing platform 738, performing a soft landing. It is depicted in the landed configuration, referred to as booster 736.

Meanwhile, the deceleration system 720 continues along its ballistic trajectory, driven by inertia, and performs inflating the volume with gas generated or stored in onboard tanks. At the apogee, when the vertical velocity reaches zero, the ballistic trajectory of system 710 intersects with trajectory 714 of space debris 712. The onboard guidance system ensures that volume 708 reaches debris trajectory 714 at the precise time for successful debris interception. As the debris penetrates the membrane of volume 708, it moves through the gas inside at hypersonic speed, experiencing substantial aerodynamic forces that decelerate its flight and break its structure. After exiting the gas volume, parts 702 and 706 of the space debris travel at velocities below orbital speed, entering Earth's atmosphere along ballistic trajectories 700 and 704, respectively. They either completely burn up or fall into designated areas on the Earth's surface.

The balloon membrane, penetrated by the debris, ruptures due to gas shock waves into pieces, causing the gas to escape into space. Pieces 718 of the destroyed volume and the deceleration system 716 continue to follow their ballistic trajectory. Upon entering Earth's atmosphere, the deceleration system 728 deploys parachute 722 and performs a soft landing on the ground or sea surface 740.

The invention claimed is:

1. A system for decelerating high-velocity objects comprising:
   at least one enclosed volume containing gas, liquid, solids, or a combination thereof;
   at least one wall or membrane that encloses the volume to contain gas, liquid, solids, or a combination thereof while allowing high-velocity objects to penetrate without causing ricochets or generating additional space debris.

2. The system of claim 1, wherein the volume can have various shapes, including but not limited to, spherical, polygonal prism-shaped, disk-shaped, and elongated configurations, such as cylindrical, blimp-like, and cigar-shaped forms.

3. The system of claim 1, wherein the volume is divided by walls or membranes into a plurality of volumes to improve the overall efficiency of the system.

4. The system of claim 1, wherein each volume contains one or a plurality of volumes to improve the overall efficiency of the system.

5. The system of claim 3 or 4, wherein each volume contains the same or different gas, liquid, solids, or a combination thereof to improve the overall efficiency of the system.

6. A method for decelerating moving space objects using a system comprised of at least one closed volume containing gas, liquid, solid particles, or a combination thereof, strategically positioned on the trajectory of the moving object or group of objects to reduce their velocity effectively without causing ricochets or generating additional space debris.

7. The method as in claim 6, wherein the additional purpose is to partially or fully destroy the object by breaking it down, melting, burning, and evaporating effectively without causing ricochets or generating additional space debris.

8. The method as in claim 6, wherein said positioning the system performed after launching it from the Earth or a celestial body either vertically or at an angle such as the tangential component of the system's velocity remains below the orbital speed preventing the system from becoming space debris.

9. The method as in claim 6, wherein said positioning the system performed by launching it from a spacecraft such as the tangential component of the system's velocity remains below the orbital speed preventing the system from becoming space debris.

10. The method as in claim 6, wherein said the system moves with orbital velocity or higher and is equipped with means preventing the system from becoming space debris or undesirable space object.

11. The method as in claim 6, wherein the system is launched from the Earth or a celestial body using a ground-based, sea-based, or airborne chemical gun.

12. The method as in claim 6, wherein the system is launched from the Earth or a celestial body using a ground-based, sea-based, or airborne electromagnetic coil gun.

13. The method as in claim 6, wherein the system is launched from the Earth or a celestial body using a ground-based, sea-based, or airborne superconducting quench gun.

14. The method as in claim 6, wherein the system is launched from the Earth or a celestial body using a rocket launched from the ground.

15. The method as in claim 6, wherein the system is launched from the Earth or a celestial body using a rocket launched from a sea platform, a ship, or a submarine.

16. The method as in claim 6, wherein the system is launched from the Earth or a celestial body using a rocket launched from an airborne carrier such as an aircraft, helicopter, airship, or balloon.

17. The method as in claim 6, wherein the system is launched or deployed from a spacecraft.

18. The method as in claim 6, wherein the closed volume comprises walls or membranes that are initially folded in order to compact said closed volume during the launch of the system, and are configured to expand, unfold, extend, or stretch when required.

19. The method as in claim 6, wherein the gas, liquid, solids, or a combination thereof is kept during the launch of the system in a compact volume in the compressed, liquified, solidified form or in a chemical form with one or more components capable of reacting and expanding to fill volume.

20. The method as in claim 6, wherein the quantity of gas, liquid, solids, or combinations thereof in the volume is controlled by injecting additional amounts or removing some amounts as required.

21. The method as in claim 6, wherein the position and orientation of the system in space before, during, and after deployment can be adjusted using rocket engines, compressed gas thrusters, reaction wheels, and other passive or active means.

22. The method as in claim 6, wherein two or more volumes connected or not connected to each other are positioned sequentially on the moving object's trajectory to perform multiple deceleration steps for the same object or group of objects.

23. The method as in claim 6, wherein relative position and orientation of two or more volumes is performed by different means that include but are not limited to tethers, struts, spacers, electric and magnetic fields, surrounding shells, nets, and membranes.

24. The method as in claim 6, wherein the elongated volume can be oriented along the moving object's trajectory to increase the amount of gas, liquid, solids, or a combination thereof interacting with the object for better deceleration.

25. The method as in claim 6, wherein the disc-shaped or flat volume can be oriented perpendicular to the moving object's trajectory to increase the likelihood of interaction with a single object or to facilitate interaction with several objects moving close to each other.

* * * * *